Patented Oct. 21, 1941

2,259,582

UNITED STATES PATENT OFFICE 2,259,582

NUTRIENT BEVERAGE

Scott Henry Perky and Carlos L. Crum, Dayton, Ohio

No Drawing. Application December 2, 1939, Serial No. 307,264

2 Claims. (Cl. 99—29)

This invention relates to a nutrient material and more particularly to a nutrient food beverage in dilute or concentrated form, and to the method of making the same. The invention relates primarily to the preparation of more nutritious materials from food products already used as human foods, or to the treatment of materials which are not now regarded as human food products so as to render them capable of use as a human food product. The invention comprises the product of this treatment whether in a dilute or a concentrated aqueous form, or in the form of a powder or solid from which the aqueous member has been substantially completely removed.

It is an object of the present invention to prepare a nutrient material either in liquid or solid form which is pleasing in appearance and taste and which is more digestible and assimilable by the human organism than the raw materials from which it is made, which contributes to a balanced diet and may be made available either as a liquid or solid; if it is made available in the solid or powdered form, the food material of the present invention may be readily brought back to the liquid or beverage consistency by simple addition of water or other liquid medium.

A further object is to provide the food material in the form of a syrup to be used as such or diluted, or in the form of a powder, or in the form of a compressed powder, such as in a tablet or wafer form which may be eaten as such.

It is another object to improve the food value to the human organism of materials which are now used as human foods but whose utilization by the human organism is not as complete as might be desired.

A further object is to prepare the food material of the present invention from raw materials which are not when in their natural or normal form generally consumed as human foods but which when treated in accordance with the process of the present invention have valuable qualities for human nutrition.

Another object is to make more readily available to the human organism the minerals in the raw materials which are subjected to treatment; while these minerals are present in the raw materials, they are not assimilable by the human organism to the desired extent and accordingly it is desired to increase the effectiveness with which these minerals, many of which are highly important to health, are utilized by the organism.

Still other objects of the present invention will more fully hereinafter appear as the description of typical methods by which the invention is carried into practice proceeds.

As raw materials which may be treated by the process of the present invention to yield the food product contemplated herein, there may be mentioned such materials as the cereals including corn, wheat, oats, rice, barley, millet, buckwheat, and the like which are now used as human food materials. Instead of the cereals, other vegetable products may be employed as raw materials for the present invention, such as potatoes, yams, carrots and other root tubers, the leaf vegetables such as spinach, leguminous vegetables such as peas, beans, etc. In addition, the stalks and leaves of such leguminous plants as clover and alfalfa may be employed. Likewise, the present invention may be employed to prepare nutrient materials from such normally waste products as corn-husks or the leaves of plants and trees and the like. In general, therefore, the present invention involves treatment of vegetable products to make them more utilizable by the human organism, and in a more specific sense it relates to the treatment of carbohydrate-containing vegetable products, such as those mentioned above and other related materials.

In accordance with the process of the present invention the raw material, such as cereal or the like, is subjected at an elevated temperature, preferably at substantially or above the boiling point of water, to the action of a dilute aqueous acid solution followed by a pepsin treatment and then by neutralization of the acid. Preferably, the aqueous acid solution employed is one having a hydrogen ion concentration in the neighborhood of .05 normal, although considerable variation may be made from this figure without departing from the spirit of the invention. The raw material is preferably in a relatively finely comminuted state prior to this treatment, and may, if desired, be previously digested with water at substantially the boiling point until swelling of the raw material has substantially completely taken place. This pretreatment of the material impregnates the pores thereof with water and greatly aids in the subsequent acid treatment by aiding in the penetration of the dilute acid into the innermost portions of the material being treated. The pretreatment with water further aids in the reduction of the particle size of the material by causing the material to disperse throughout the water.

The treatment with dilute acid at or above the boiling point of water is continued for the length of time required to substantially completely hydrolyze the starch, cellulose and other carbohydrate material to the readily digestible monosaccharides such as glucose and to convert the difficultly assimilable compounds containing minerals such as calcium, phosphorus and the like to such an extent that these minerals are rendered readily assimilable as, for example, by being converted to inorganic compounds. The treatment with acid may be carried out at atmospheric pressure if desired, or elevated temperature, as for example in an autoclave. If the mixture is heated at atmospheric pressure, a substantially longer period of treatment is required as, for example, five to ten hours. If, on the other hand, an autoclave is used with superatmospheric pressure, the time of treatment may be correspondingly reduced, while at the same time producing a substantially identical product with that produced at atmospheric pressure and over a longer period of time. The degree of pressure employed may vary from atmospheric up to 10 to 20 atmospheres, the limitations upon the conditions of treatment being that they must not cause carbonization or other undesirable degradation of the constituents of the mixture.

As examples of acids which may be employed, we may use practically any organic or inorganic acid or mixture thereof which forms edible salts and which in reasonably small concentrations will produce the hydrogen ion concentration referred to above. For example, we may use the inorganic acids such as hydrochloric or sulphuric acid. We prefer not to use nitric acid because of its tendency to form unstable explosive compounds with the carbohydrates in the raw material. As examples of organic acids, such edible acids as citric and tartaric acids may be employed. If desired, mixtures of the stronger inorganic acids such as hydrochloric or sulphuric acids with the relatively weaker organic acids such as citric or tartaric may be employed.

Following the acid digestion, the mixture is allowed to cool and is then treated at a relatively low temperature, which, however, is preferably above room temperature with a small amount of pepsin, which is a digestible ferment obtained from the stomach and allowed to stand in contact with the pepsin for an extended period, as for example, for an hour at, say 30° C. This treatment converts the proteins in the product to peptones and proteoses which are more readily digestible than the proteins appearing in the product. The action of the pepsin is accelerated by the presence of the hydrogen ion concentration.

The next step is the neutralization of the acid in the mixture. This may be accomplished by the addition of a suitable edible base such as sodium carbonate, sodium bicarbonate, sodium hydroxide, or the corresponding potassium compounds. Since it is important to prevent the solution from being rendered basic because this causes a precipitation of the minerals which are present largely as the acid salts, we prefer to add the base in the form of an aqueous solution slowly and with constant agitation in order to prevent as far as possible any portion of the solution from being carried beyond the neutral point. If desired, the neutralizing material may be added in the form of a powder which is sprinkled into the solution slowly and with constant stirring. The addition of the neutralizing base is continued until nearly all of the acid present in the solution is neutralized and the solution shows only a very slight acid reaction to litmus.

The solution thus obtained is then filtered in order to remove coarse particles, as for example, by first filtering through a coarse filter such as cheese cloth and subsequently through a finer filter, such as cotton flannel.

The final solution thus obtained is the base from which beverage may be made by dilution or which may be concentrated by evaporation to a syrup or to a powder. If the evaporation is continued to the powdered form, it is desirable to carry out the evaporation under reduced pressure in order to prevent decomposition of the compounds present in the final product. The final solution may if desired, be converted to powdered form by spray-drying in the known manner.

The percentage of acid employed by weight of the raw material treated will depend upon the extent to which the acid ionizes in dilute solution, but may lie in the neighborhood of 1% to 4%. In the case of a highly ionizing acid such as hydrochloric or sulfuric acid, the percentage may be as low as 1% while in the case of an acid ionizing to a less extent, such as tartaric acid, it may run as high as 2½ up to 4%.

The amount of water present in the mixture during conversion should be sufficient to make a very fluent mixture and may vary from five to ten times the weight of the raw material. The quantity of water should be such as to give a fluent consistency after complete reduction and conversion and should be such as to reduce the concentration of acid to a non-injurious figure since it is desired that the hydrogen ion concentration of the acid effect the conversion and that dehydrating action of the acid on the raw material be prevented. By using a great deal of water, the concentration of acid is reduced to a suitable low figure, say in the neighborhood of 0.1 to 0.7% of the weight of the mixture (raw material and water), and at the same time the ionization of the acid is facilitated so that the hydrogen ion concentration is at the desired figure near 0.05 normal.

In carrying out the process outlined herein, it is highly desirable to prevent heavy metal contamination of the material. This is particularly true of the main step in the process in which the raw material is maintained at the boiling temperature for a considerable period of time. In order to prevent such metallic contamination, we prefer to carry out the treatment in nonmetallic containers, such as containers made of glass or steel, or iron coated with vitreous enamel such as the ordinary enameled ware. We may use glass lined steel containers, rubber lined containers, or similar containers and equipment known to those skilled in the art and which are free from any tendency to contaminate the products treated therein with metallic compounds derived from the container material. The equipment may also be constructed from noncorrosive metals, such as Monel metal or the like.

Below, we give several typical examples of modes in which the present invention can be carried out. It will be understood that these examples are merely illustrative of the principles of the invention and that we are not limited to the specific conditions set forth therein, but may vary these conditions within wide limits without departing from the spirit of the invention. In each of the examples, the final filtration is carried out first through cheese cloth as a coarse filter and then through cotton flannel as a fine filter.

*Example 1*

Two cups of rolled oats (about 250 grams) are placed in a glass or granite ware container with sufficient water (about 500 grams) to moisten them and to cover them well. The container is then placed over a water bath at the boiling point by which the oats and water are brought to the boiling point. They are kept at this temperature until the grain shows no further tendency to swell, this usually requiring about thirty minutes. Then boiling water is added to the mixture in sufficient quantity to bring the total volume up to two liters (the mixture weighs about 2000 grams). Nine cubic centimeters of hydrochloric acid (sp. gr. 1.17; 34% HCl) are added to the mixture and thoroughly stirred through it. This gives a hydrogen ion concentration of .05 normal, the pH being about 1.3. The heating is then continued for six hours, the volume being maintained constant by the addition of boiling water as required. At the conclusion of the treatment, the starch and other carbohydrate material has been hydrolyzed to the readily digestible monosaccharides, principally glucose, the other constituents in the mixture have been radically modified, many of the ingredients in the raw material have been extracted, and the minerals such as calcium, phosphorus, and iron have been converted to the soluble and thus readily assimilable form.

The solution is now allowed to cool to 30° C., whereupon two-tenths of a gram of pepsin is added and stirred throughout the mixture and the mixture thus obtained is maintained at this temperature for one hour. This digestive ferment in the presence of the hydrogen ion concentration in the solution converts the proteins to the more readily digestible peptones and proteoses.

After this pepsin treatment, sodium carbonate either in aqueous solution or in powdered form is added slowly with constant agitation until the solution shows only a slight acid reaction to litmus.

The solution is then filtered, yielding the base which may be further treated as outlined above in order to yield the product in the desired physical form.

*Example 2*

Two cups (about 400 grams) of corn meal in the form of whole ground grains are carefully sprinkled with constant stirring into one liter of cold water. The resulting thin batter is placed in a suitable container over a water bath at the boiling point, and is thus brought to the boiling point. The mixture is maintained at this temperature until the meal has ceased to swell further, whereupon sufficient boiling water is added to bring the total volume to two liters, (the mixture weighs about 2000 grams). While the mixture is still boiling, ten grams of tartaric acid crystals (in a solution in ten grams of water) are added with constant stirring, yielding a hydrogen ion concentration of approximately .06 normal (assuming complete ionization) and a pH of approximately 1.2. The mixture is maintained at the boiling temperature for eight hours, the volume being kept constant by the addition of boiling water as necessary. This treatment hydrolyzes the carbohydrate material to monosaccharides, principally glucose, converts the mineral elements of the grain into soluble forms and extracts the proteins.

The solution is allowed to cool to 30° C., whereupon two tenths of a gram of pepsin is added and the mixture is maintained at this temperature for one hour.

Sodium bicarbonate in powdered form is now added carefully with constant stirring until the solution shows just a faint acid reaction to litmus. The solution is then filtered as before and the resulting clear liquid is the final solution or base which may be diluted, concentrated to a syrup or reduced to a powder.

*Example 3*

Three cups (about 600 grams) of whole grains of wheat are heated in about 800 grams of boiling water for about thirty minutes until they soften and swell. They are then removed by filtration and finely crushed in a chopper. Two cups (about 400 grams) of crushed swollen grain (derived from 200 grams of original whole wheat) are mixed with the filtered liquid and water is added to bring the total volume to two liters (the mixture weighs about 2000 grams). There is then added to the mixture with stirring, five grams of citric acid crystals and 5 c. cm. of concentrated hydrochoric acid (sp. gr. 1.18, 35%). The mixture is now transferred to an autoclave where it is heated for one hour under two atmospheres of pressure absolute (fifteen pounds per square inch gauge). This brings about rapid hydrolysis of the starch and cellulose of the grain to monosaccharides, principally glucose and frees soluble proteins and minerals.

The solution is permitted to cool to 30° C., whereupon two tenths of a gram of pepsin is added with stirring and allowed to stand in contact with the product for one hour.

The solution is then nearly completely neutralized by the careful addition of sodium bicarbonate in powdered form until the solution shows only a faint acid reaction to litmus. The solution is then filtered as before and the clear liquid thus obtained is the final solution which may be used as such or may be converted to other physical forms as outlined above.

*Example 4*

Two cups (about 450 grams) of freshly washed and ground yams are admixed with water to a total volume of two liters (the mixture weighs about 2000 grams). Then five cubic centimeters of concentrated sulphuric acid (sp. gr. 1.84 containing 94% $H_2SO_4$) and five grams of citric acid in crystalline form are carefully stirred through the mixture.

The mixture thus obtained is then heated over a water bath at the boiling point and is maintained at the boiling point for a period of two hours until hydrolysis of the starch and digestion of the potato has begun. A reflux condenser is then attached to the container and the container is placed directly over the flame or source of heat, thus permitting the boiling point of the mixture to be attained. The mixture is heated under these conditions with refluxing for five hours.

At the end of this five hour period, the heating is discontinued. The starch has now been converted to the soluble monosaccharides, principally glucose and the protones and minerals are in the solution. The solution is cooled to 30° C., whereupon two tenths of a gram of pepsin is added with stirring, the mixture being allowed to stand for one hour, during which time the pepsin brings about a partial digestion of the proteins, converting them to peptones and proteoses.

The mixture is now neutralized with a dilute solution of sodium hydroxide (.1 normal NaOH) with constant stirring until it shows only a slight acid reaction to litmus. As before, it is essential that the solution be left slightly acidic in order to prevent the precipitation of calcium and phosphorus and other minerals which appear to be present as other acid salts. The mixture is then filtered as before and the resulting final solution is the product sought.

If desired, we may add an anti-oxidant to the mixture. This anti-oxidant aids in keeping the product. The anti-oxidant may take the form of ascorbic acid (vitamin C) which thus aids in preventing deterioration of the product and in addition adds to the nutritive value of the product. If desired, the products obtained from two or more raw materials treated in accordance with the present invention may be mixed together for an improved protein effect, for improving flavor, for modifying the nutritive value, and the like.

It will be seen from the foregoing that we have devised a highly useful process for the improvement of the food values of carbohydrate raw materials which in their natural form or in the form in which they are now processed, do not have a desirably high food value. It will further be seen that the present invention makes available a food product of ready assimilability and digestibility, this product being capable of production at low cost and in a simple and convenient manner.

Because an acid condition is maintained at all times during the preparation of the product, it is quite likely that only a very slight, if any, destruction of the water soluble vitamins B, C and G takes place. Also, since the finished product is left on the acid side of the neutral point, the nutrient base lends itself favorably to the further additions of vitamins of the water soluble varieties over and above those found in the natural product.

Since the finished product will be slightly acid, the nutrient base lends itself favorably to the addition of valuable minerals such as calcium, phosphorus and iron as their soluble acid salts in which form they are readily assimilable, should it be found desirable to fortify those quantities which are extracted from the natural product.

While we have given specific information as to the preferred method of carrying the invention into practice, it is to be understood that we are not confined thereto, but may make such modifications and adaptations as are obvious to those skilled in the art and as fall within the spirit of the invention as defined in the appended claims.

Having thus fully described our invention, what we claim as new and desire to secure by Letters Patent is:

1. The process of treating a complex protein- and carbohydrate-containing raw vegetable material to improve its digestibility and vitamin and mineral food value which comprises mixing the material with a relatively great excess of a dilute aqueous acid, subjecting the mixture to an elevated temperature equal to at least the boiling point at atmospheric pressure of the mixture for a period of time which is sufficiently prolonged to cause conversion of the complex carbohydrate portion of the material to monosaccharides, discontinuing the heating, allowing to cool, subjecting the cooled mixture to the action of pepsin added thereto and intimately dispersed therethrough for a prolonged period of time to cause conversion of the complex protein portion of the material to more readily assimilable proteoses and peptones, and subsequently almost completely neutralizing the free acid in the mixture by adding a base thereto slowly and with constant stirring of the mixture and separating the undigested residue.

2. The process of improving the human assimilability of a cereal which comprises digesting the cereal at a temperature of at least 100° C. with an excess by weight of water to swell and disperse the same, then digesting the swollen and dispersed material in the presence of water in an amount from five to ten times the original weight of the cereal and in the presence of acid in an amount such as to give a hydrogen ion concentration in the mixture of in the neighborhood of 0.05 normal at a temperature of at least 100° C. for a period of time sufficient to hydrolyze the complex carbohydrates in the cereal to monosaccharide, to reduce the complex proteins therein to more readily assimilable proteins, and to render the minerals in the cereal water-soluble, then subjecting the aqueous mixture thus obtained to the action of pepsin for a sufficient period of time to convert the reduced proteins to peptones and proteoses, and then adding a base to the resulting mixture in quantity such as to almost but not completely neutralize the acid therein and separating the water soluble material.

SCOTT HENRY PERKY.
CARLOS L. CRUM.